United States Patent [19]

Nagase

[11] Patent Number: 5,771,137
[45] Date of Patent: Jun. 23, 1998

[54] THERMALLY STABLE MAGNETIC HEAD ASSEMBLY WITH MAGNETIC HEAD LEGS BONDED TO INSULAR PORTIONS CONNECTED TO FLEXIBLE FRAME VIA BRIDGES

[75] Inventor: Fumio Nagase, Mitaka, Japan

[73] Assignee: Teac Corporation, Tokyo, Japan

[21] Appl. No.: 671,073

[22] Filed: Jun. 27, 1996

Related U.S. Application Data

[63] Continuation of Ser. No. 247,005, May 20, 1994, abandoned.

[30] Foreign Application Priority Data

| May 21, 1993 | [JP] | Japan | 5-032011 U |
| Nov. 26, 1993 | [JP] | Japan | 5-068101 U |

[51] Int. Cl.$^6$ ..................................................... G11B 5/48
[52] U.S. Cl. ............................................................ 360/104
[58] Field of Search .................................. 360/104, 105, 360/106, 99.01, 97.04, 97.02, 97.01, 129

[56] References Cited

U.S. PATENT DOCUMENTS

| 4,261,024 | 4/1981 | Desserre | 360/104 |
| 4,449,155 | 5/1984 | Meier et al. | 360/104 |
| 4,602,306 | 7/1986 | Noda | 360/99.06 |
| 4,709,285 | 11/1987 | Enami et al. | 360/104 |
| 4,748,527 | 5/1988 | Fujioka et al. | 360/129 |
| 4,811,140 | 3/1989 | Enami et al. | 360/104 |

FOREIGN PATENT DOCUMENTS

| 62-103886 | 5/1987 | Japan | 360/104 |
| 63-313376 | 12/1988 | Japan | 360/104 |
| 02-260208 | 10/1990 | Japan | 360/104 |
| 03-189976 | 8/1991 | Japan | 360/104 |
| 05-314630 | 11/1993 | Japan | 360/104 |
| 05-314699 | 11/1993 | Japan | 360/104 |

*Primary Examiner*—Craig A. Renner
*Attorney, Agent, or Firm*—Woodcock Washburn Kurtz Mackiewicz & Norris LLP

[57] ABSTRACT

A magnetic head unit has a pair of spaced apart mounting legs bonded to a flexure seat thereby to be resiliently supported. Being made from sheet steel or the like, the flexure seat is more thermally expansible than the head unit. Should the pair of mounting legs be thermally spread apart from each other, the head unit would be strained to such an extent as to fail to make proper data transfer contact with the rotating magnetic disk. In order to avoid this danger, the flexure seat is configured to include a frame portion defining an opening, and a pair of spaced apart insular portions disposed in the opening in the frame portion and independently joined thereto via slender bridge portions. The head unit is mounted to this flexure seat by having the pair of mounting legs thereof bonded one to each insular portion.

14 Claims, 4 Drawing Sheets

THERMALLY STABLE MAGNETIC HEAD ASSEMBLY WITH MAGNETIC HEAD LEGS BONDED TO INSULAR PORTIONS CONNECTED TO FLEXIBLE FRAME VIA BRIDGES

This is a continuation of application Ser. No. 08/247,005, filed May 20, 1994, now abandoned.

BACKGROUND OF THE INVENTION

This invention relates to a magnetic head assembly comprising a head unit and a flexure seat therefor, for use in apparatus, commonly known as disk drives, for data transfer with a rotating flexible magnetic disk. More specifically, the invention pertains to such a head assembly featuring provisions for preventing the assembly from being thermally strained.

In a disk drive for use with a double sided flexible magnetic disk, for example, the pair of magnetic head units are both mounted on flexure seats for optimum data transfer contact with the disk. Both head units may be gimbaled, as disclosed in U.S. Pat. No. 4,602,306 to Noda, or only one of them gimbaled, as taught by U.S. Pat. No. 4,709,285 to Enami et al., both patents being assigned to the assignee of the instant application. Typically, each such head unit comprises a gapped magnetic core having a coil wound thereon, and a pair of sliders affixed to the opposite sides of the core. The sliders are formed to include a pair of spaced apart mounting legs which are bonded to the flexure seat.

A problem has been encountered in connection with such head assemblies because of the difference between the coefficients of thermal expansion of the head unit and the flexure seats. Generally, the core is of ferrite, the sliders are of a ceramic, and the flexure seat is of stainless steel or beryllium copper in sheet form. The flexure seat is therefore much more thermally expansible than the head unit.

The laboratory testing of the head assemblies, in which heat shocks and heat cycles were applied, indicated that the pair of mounting legs of each head unit were spread apart with the expansion of the flexure seat in its own plane, to the maximum of approximately two or three micrometers. As the mounting legs were thus strained and torsioned, the gapped surface of the magnetic core suffered a corresponding displacement away from the plane of the magnetic disk, adversely affecting data transfer with the disk. Although such substantive straining of the head units is believed to seldom occur in the normal use of disk drives, it is nevertheless undesirable and should be precluded in order to enhance their reliability under all the possible working conditions.

SUMMARY OF THE INVENTION

The present invention thus seeks to make head assemblies of the type under consideration more thermally stable and trouble free in a wider temperature range than is normally encountered in the use of the disk drives incorporating such head assemblies.

Briefly, the invention provides a magnetic head assembly comprising a magnetic head unit having a pair of spaced apart mounting legs, and a flexure seat for resiliently supporting the head unit. Fabricated from a piece of resilient sheet material, the flexure seat includes a frame portion defining at least one opening, a pair of spaced apart insular portions disposed in the opening in the frame portion, and a plurality of bridge portions substantially independently joining the insular portions to the frame portion.

Thus the head unit may be mounted to the flexure seat by bonding the pair of mounting legs of the head unit to the pair of insular portions, respectively, of the flexure seat. Both head unit and flexure seat can be made from any such conventional materials as have proved to be admirably well suited for the functioning of the parts for which they are intended. Despite the resulting difference between the coefficients of thermal expansion of the head unit and the flexure seat, the thermal expansion of the flexure seat in its own plane does not result in the spreading of the mounting legs and, therefore, not in the straining of the head unit in any way for this reason, because the insular portions are substantially independently joined to the frame portion. The head unit can nevertheless resiliently oscillate on the flexure seat just as on prior art flexure seats of comparable design.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

The invention will now be described in detail as embodied in the magnetic head assembly shown in FIGS. 1 and 2 and therein generally designated 10. Broadly, the representative head assembly 10 comprises a magnetic head unit 12 and a flexure seat 14.

Figure 1:
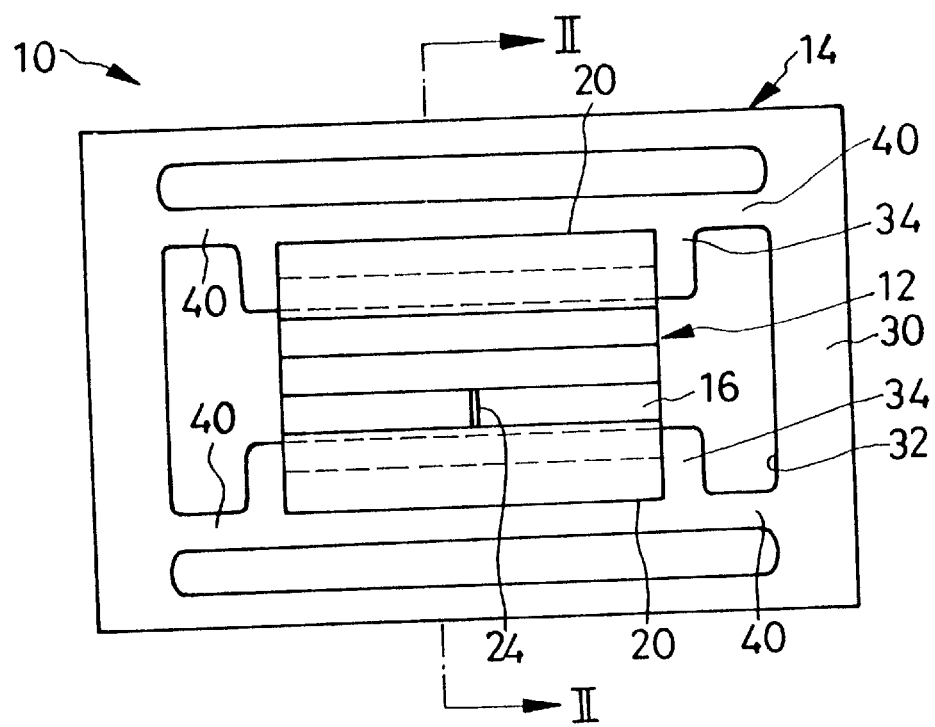
FIG. 1 is a plan view of one preferred form of magnetic head assembly constructed in accordance with the novel concepts of this invention.
Figure 2:
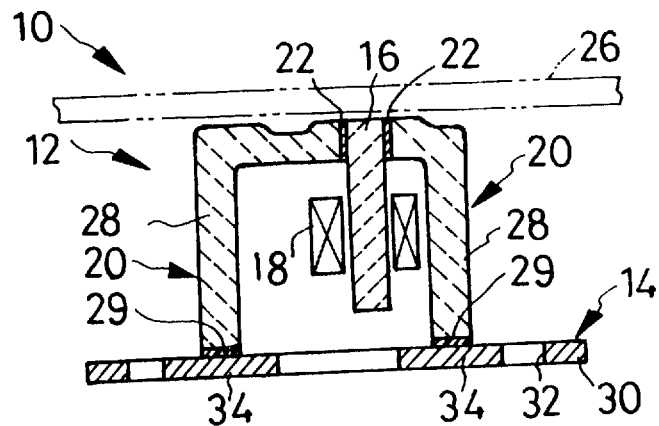
FIG. 2 is a section through the head assembly, taken along the line II—II in FIG. 1.

As better revealed by FIG. 2, the head unit 12 can be of conventional design comprising a magnetic core 16 of generally flat, rectangular shape having a coil 18 wound thereon, and a pair of sliders 20 of ceramic or like material bonded at 22 to the opposite sides of the core. The magnetic core 16 has a gap 24, FIG. 1, in its surface exposed between the pair of sliders 20 for data transfer with a rotating flexible magnetic disk 26. The pair of sliders 20 of the head unit 12 are both L shaped in cross section, providing a pair of mounting legs 28 which are bonded at 29 to the flexure seat 14. The magnetic core 16 is of ferrite.

Conventionally, as has been discussed in connection with the prior art, the pair of mounting legs 28 of the head unit 12 were spread apart when the head assembly was heated under laboratory test conditions, because of the higher coefficient of thermal expansion of the flexure seat. The resulting strain of the head unit was such that the gapped surface of the core 16 was displaced away from the plane of the magnetic disk 26, resulting in failure in data transfer between head and disk in the worst case. The present invention overcomes this difficulty by configuring the flexure seat 14 as set forth hereafter.

Figure 3:
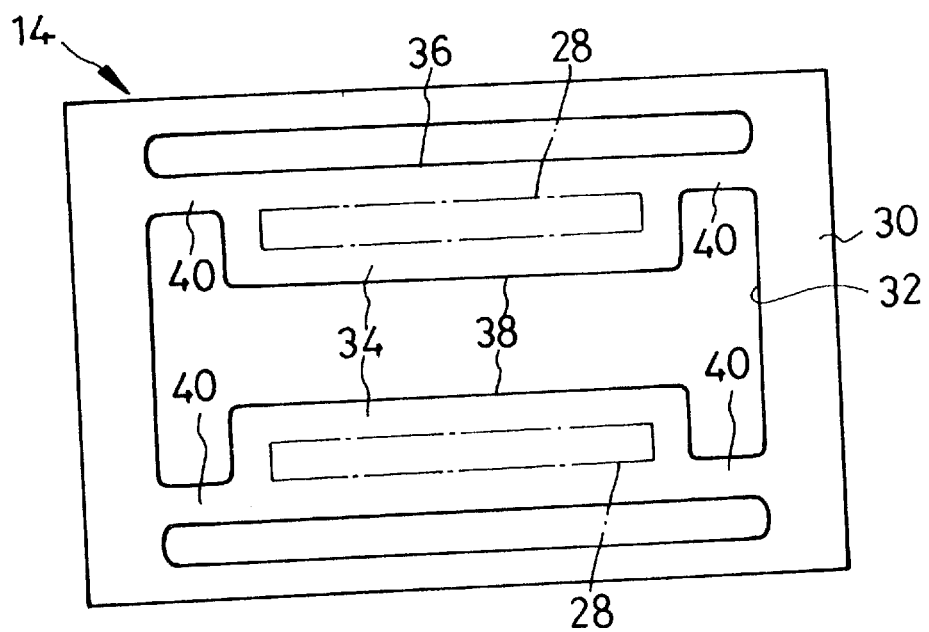
FIG. 3 is a plan view of the flexure seat of the FIGS. 1 and 2 head assembly.

FIG. 3 best illustrates the improved configuration of the flexure seat 14 according to the invention. Formed by punching sheet steel with a thickness of, typically, 150 micrometers (SUS 304), the flexure seat 14 includes a frame portion 30 of substantially annular shape which is to be fastened, bonded or otherwise secured to a head carriage or equivalent part of a disk drive.

Disposed in the opening 32 bounded by the frame portion 30 are a pair of elongate insular portions 34 extending in parallel spaced relationship to each other. Each insular portion 34 has a first longitudinal edge 36 disposed close to the frame portion 30, and a second longitudinal edge 38 disposed adjacent the similar edge of the other insular portion. A pair of bridge portions 40 join the opposite ends of each insular portion 34 to the frame portion 30. Much less in width than the insular portion 34, each pair of bridge portions 40 are in line with the first longitudinal edge 36 of one insular portion 34.

As will be understood by referring back to FIGS. 1 and 2, the head unit 12 is mounted on the flexure seat 14 of the above improved configuration by bonding the pair of mounting legs 28 to the pair of insular portions 34, respectively, of the flexure seat at 29. Thus the head unit 12 is substantially gimbaled on the flexure seat 14.

It will be appreciated that the pair of mounting legs 28 of the head unit 12 are independently bonded to the pair of insular portions 34 of the flexure seat 14, there being no direct connection between these insular portions in this embodiment. Consequently, no matter how much heat is applied to the head assembly 10, the pair of mounting legs 28 are not to be spread apart by the expansion of the flexure seat 14. The head unit 12 is therefore not to be strained.

Second Form

Figure 4:
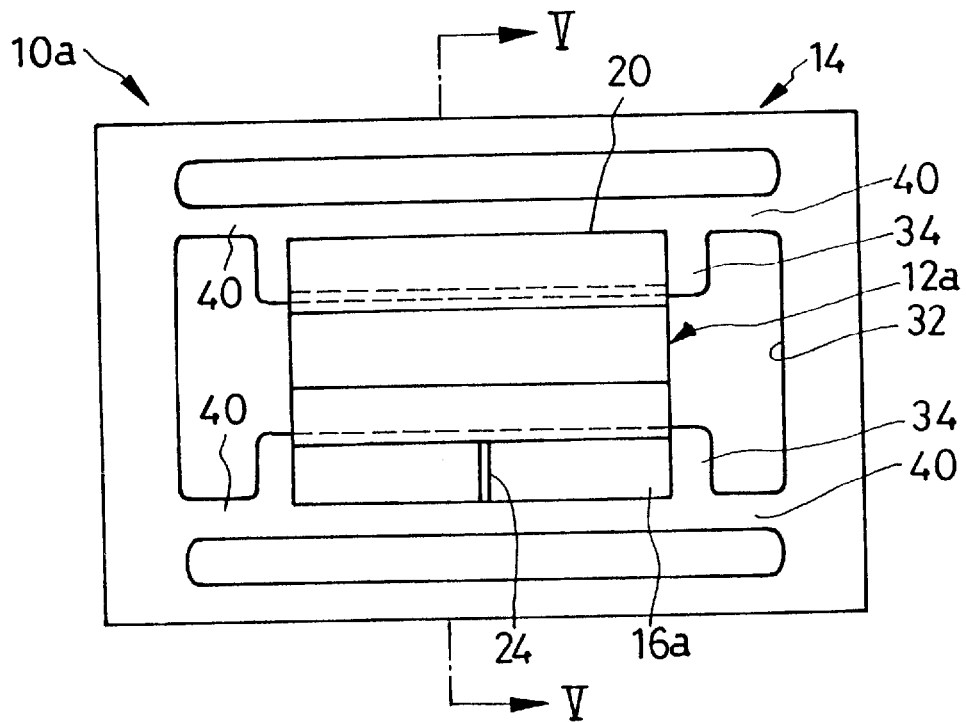
FIG. 4 is a plan view of another preferred form of magnetic head assembly according to the invention.
Figure 5:
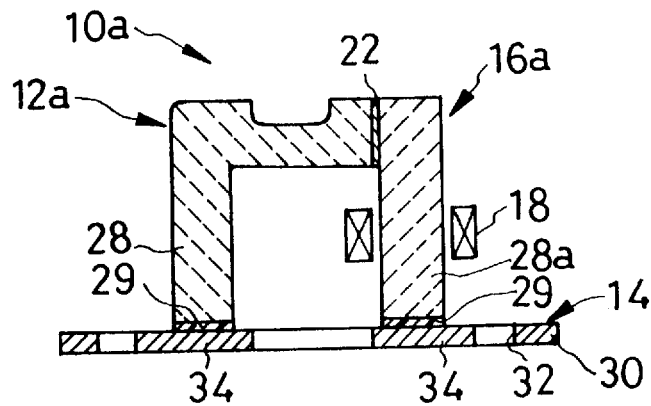
FIG. 5 is a section through the head assembly, taken along the line V—V in FIG. 4.

The head assembly 10a shown in FIGS. 4 and 5 by way of another preferred embodiment of the invention is a combination of a head unit 12a of modified construction and the flexure seat 14 of the same configuration as that of the FIGS. 1–3 embodiment. The modified head unit 12a has but one slider 20 bonded at 22 to a magnetic core 16a. This core is made taller than its counterpart of the preceding embodiment in order to provide a mounting leg 28a. This mounting leg, and the other mounting leg 28 provided by the single slider 20, are both bonded at 29 to the respective insular portions 34 of the flexure seat 14.

The head assembly 10a is similar in the other details of construction to the FIGS. 1–3 head assembly 10. The advantages gained by the head assembly 10a are also considered self evident from the foregoing description of FIGS. 1–3.

Third Form

Figure 6:
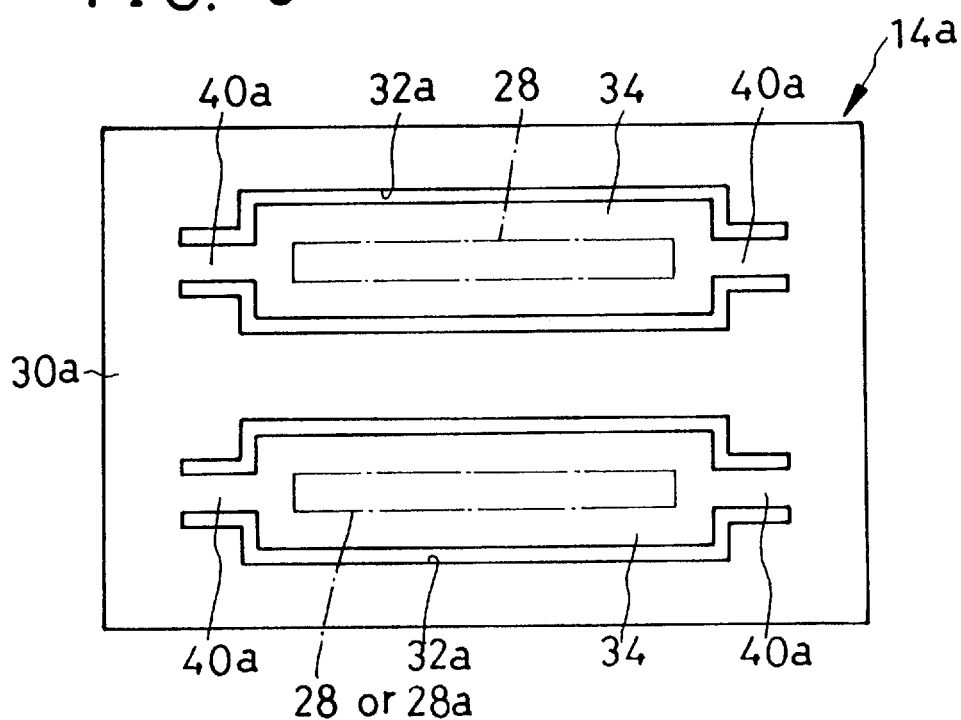
FIG. 6 is a plan view of an alternate flexure seat for use in either the FIGS. 1–3 or FIGS. 4 and 5 head assembly.

FIG. 6 shows another preferred flexure seat 14a which lends itself to use with either the head unit 12 of FIGS. 1 and 2 or the head unit 12a of FIGS. 4 and 5. The flexure seat 14a includes a frame portion 30a having a pair of elongate openings 32a formed therein in parallel spaced relationship to each other. The pair of insular portions 34 are disposed one in each of these openings 32a and joined to the frame portion 30a each via a pair of bridge portions 40a Each pair of bridge portions 40a are shown to be in centerline alignment with one insular portion 34.

The FIGS. 1 and 2 head unit 12 may be mounted to the flexure seat 14a by bonding the pair of mounting legs 28 to the pair of insular portions 34, and the FIGS. 4 and 5 head unit 12a by bonding the pair of mounting legs 28 and 28a to the pair of insular portions 34. With no direct connection between the pair of insular portions 34, the flexure seat 14a offers the same advantages as does the flexure seat 14.

Fourth Form

Figure 7:
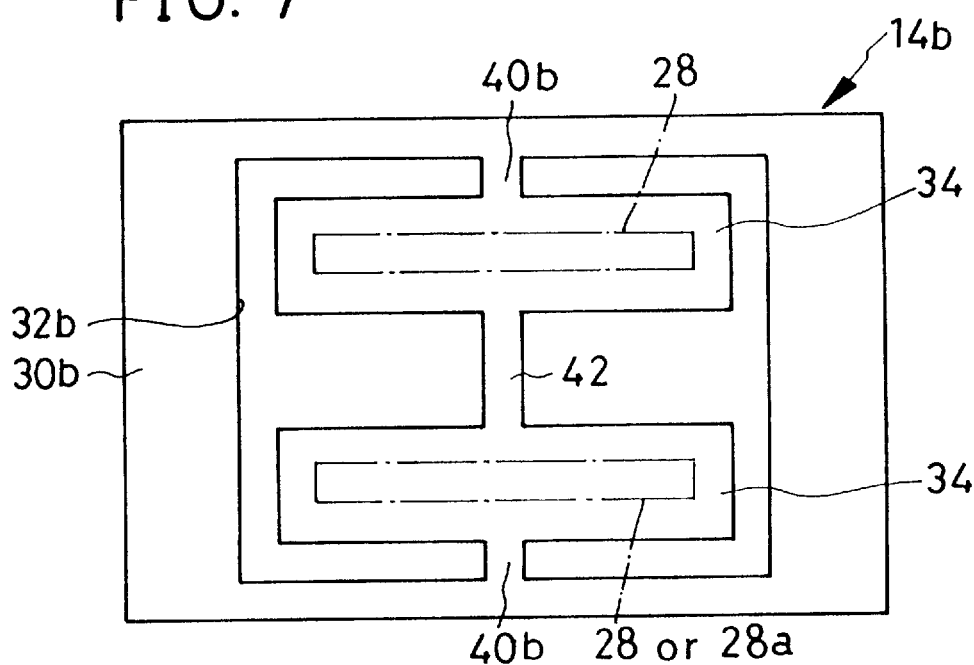
FIG. 7 is a plan view of another alternate flexure seat for use in either the FIGS. 1–3 or FIGS. 4 and 5 head assembly.

Still another preferred flexure seat 14b of FIG. 7 also lends itself to use in place of the flexure seat 14 in either the FIGS. 1 and 2 head assembly 10 or the FIGS. 4 and 5 head assembly 10a. The flexure seat 14b has a frame portion 30b defining an opening 32b. Disposed in this opening 32b in parallel spaced relationship to each other, the pair of elongate insular portions 34 are joined to the frame portion 30b each via a single bridge portion 40b and further to each other via another similar bridge portion 42. The three bridge portions 40b and 42 are all aligned transversely of the insular portions 34.

The FIGS. 1 and 2 head unit 12 or the FIGS. 4 and 5 head unit 12a may be mounted to the flexure seat 14b by bonding the pair of mounting legs 28, or 28 and 28a, to the pair of insular portions 34. This flexure seat 14b differs from the two preceding examples 14 and 14a in that the pair of insular portions 34 are directly interconnected by the bridge portion 42. However, this bridge portion is so small compared with the entire flexure seat 14b and the head unit 12 or 12a that the pair of mounting legs of either head unit are not to be thermally spread apart to such an extent as to affect data transfer between head unit and magnetic disk.

The teachings of this invention may be applied to various other head assemblies in which the head units are monoaxially or biaxially gimbaled or otherwise supported on flexure seats. It is therefore appropriate that the invention be construed broadly and in a manner consistent with the fair meaning or proper scope of the claims which follows.

What is claimed is:

1. A magnetic head assembly for data transfer with a flexible magnetic disk, comprising:

(A) a magnetic head unit having a magnetic core, a coil wound on the magnetic core, and a pair of sliders bonded to the opposite sides of the core, the pair of sliders having a pair of spaced apart mounting legs which, if thermally spread apart from each other, would cause the head unit to undergo deformation such that the head unit might fail to make data transfer with the disk; and (B) a flexure seat for resiliently supporting the head unit, the flexure seat being made from a piece of resilient sheet material and being more thermally expansible than the head unit, the flexure seat comprising:

(a) a frame portion defining at least one opening;

(b) a pair of spaced apart insular portions disposed in the opening in the frame portion, the head unit being mounted to the flexure seat by having each distal end of the pair of mounting legs thereof bonded to each of the insular portions, respectively; and (c) a plurality of bridge portions extending from and joining opposite ends of each insular portion to the frame portion, the insular portions being completely separate from each other and the frame portion except for the plurality bridge portions, whereby, being independently bonded to the pair of insular portions of the flexure seat, the pair of mounting legs of the head unit are not thermally spread apart from each other due to difference between the coefficients of thermal expansion of the head unit and the flexure seat.

2. A magnetic head assembly for data transfer with a flexible magnetic disk, comprising:
   (A) a magnetic head unit having a magnetic core, a coil wound on the magnetic core, and a pair of sliders bonded to the opposite sides of the core, the pair of sliders having a pair of spaced apart mounting legs which, if thermally spread apart from each other, would cause the head unit to undergo deformation such that the head unit might fail to make data transfer with the disk; and
   (B) a flexure seat for resiliently supporting the head unit, the flexure seat being made from a piece of resilient sheet material and being more thermally expansible than the head unit, the flexure seat comprising:
      (a) a frame portion defining an opening;
      (b) a pair of elongate insular portions extending in parallel spaced relationship to each other in the opening in the frame portion, the head unit being mounted to the flexure seat by having each distal end of the pair of mounting legs thereof bonded to each of the insular portions, respectively; and
      (c) a pair of aligned bridge portions extending from and joining opposite ends of each insular portions to the frame portion, the insular portions being completely separate from each other and the frame portion except for the pair of bridge portions
   whereby, being independently bonded to the pair of insular portions of the flexure seat, the pair of mounting legs of the head unit are not thermally spread apart from each other due to difference between the coefficients of thermal expansion of the head unit and the flexure seat.

3. The magnetic head assembly of claim 2, wherein each of the pair of elongate insular portions has a first longitudinal edge disposed adjacent the other insular portion, and a second longitudinal edge disposed away from the other insular portion, and wherein each of the pair of bridge portions extends in line with each of the second longitudinal edges of the insular portions, respectively.

4. A magnetic head assembly for data transfer with a flexible magnetic disk, comprising:
   (A) a magnetic head unit having a magnetic core, a coil wound on the magnetic core, and a pair of sliders bonded to the opposite sides of the core, the pair of sliders having a pair of spaced apart mounting legs which, if thermally spread apart from each other, would cause the head unit to undergo deformation such that the head unit might fail to make data transfer with the disk; and
   (B) a flexure seat for resiliently supporting the head unit, the flexure seat being made from a piece of resilient sheet material and being more thermally expansible than the head unit, the flexure seat comprising:
      (a) a frame portion defining a pair of openings;
      (b) a pair of elongate insular portions each disposed in each of the openings in the frame portion, respectively and extending in parallel spaced relationship to each other, the head unit being mounted to the flexure seat by having each distal end of the pair of mounting legs thereof bonded to each of the insular portions, respectively; and
      (c) a pair of aligned bridge portions extending from and joining opposite ends of each insular portion to the frame portion, the insular portions being completely separate from each other and the frame portion except for the pair of bridge portions,
   whereby, being independently bonded to the pair of insular portions of the flexure seat, the pair of mounting legs of the head unit are not thermally spread apart from each other due to difference between the coefficients of thermal expansion of the head unit and the flexure seat.

5. The magnetic head assembly of claim 4 wherein each pair of bridge portions are in centerline alignment with each of the insular portions, respectively.

6. A magnetic head assembly for data transfer with a flexible magnetic disk, comprising:
   (A) a magnetic head unit having a magnetic core, a coil wound on the magnetic core, and a slider bonded to the magnetic core, the slider having a first mounting leg, the magnetic core having a second mounting leg, the first and the second mounting legs which, if thermally spread apart from each other, would cause the head unit to undergo deformation such that the head unit might fail to make data transfer with the disk; and
   (B) a flexure seat for resiliently supporting the head unit, the flexure seat being made from a piece of resilient sheet material and being more thermally expansible than the head unit, the flexure seat comprising:
      (a) a frame portion defining at least one opening;
      (b) a pair of spaced apart insular portions disposed in the opening in the frame portion, the head unit being mounted to the flexure seat by having each distal end of the first and second mounting legs thereof bonded to each of the insular portions, respectively; and
      (c) a plurality of bridge portions extending from and joining opposite ends of each insular portion to the frame portion, the insular portions being completely separate from each other and the frame portion except for the plurality of bridge portions,
   whereby, being independently bonded to the pair of insular portions of the flexure seat, the first and the second mounting legs of the head unit are not thermally spread apart from each other due to difference between the coefficients of thermal expansion of the head unit and the flexure seat.

7. A magnetic head assembly for data transfer with a flexible magnetic disk, comprising:
   (A) a magnetic head unit having a magnetic core, a coil wound on the magnetic core, and a slider bonded to the magnetic core, the slider having a first mounting leg, the magnetic core having a second mounting leg, the first and the second mounting legs which, if thermally spread apart from each other, would cause the head unit to undergo deformation such that the head unit might fail to make data transfer with the disk; and
   (B) a flexure seat for resiliently supporting the head unit, the flexure seat being made from a piece of resilient sheet material and being more thermally expansible than the head unit, the flexure seat comprising:
      (a) a frame portion defining an opening;
      (b) a pair of elongate insular portions extending in parallel spaced relationship to each other in the opening in the frame portion, the head unit being mounted to the flexure seat by having each distal end of the first and second mounting legs thereof bonded to each of the insular portions, respectively; and
      (c) a pair of aligned bridge portions extending from and joining opposite ends of each insular portion to the frame portion, the insular portions being completely separate from each other and the frame portion except for the pair of bridge portions,
   whereby, being independently bonded to the pair of insular portions of the flexure seat, the first and the second mounting legs of the head unit are not thermally spread apart from each other due to difference between the coefficients of thermal expansion of the head unit and the flexure seat.

8. The magnetic head assembly of claim 7 wherein each of the pair of elongate insular portions has a first longitudinal edge disposed adjacent the other insular portion, and a second longitudinal edge disposed away from the other insular portion, and wherein each of the pair of bridge portions extends in line with each of the second longitudinal edges of the insular portions, respectively.

9. A magnetic head assembly for data transfer with a flexible magnetic disk, comprising:

(A) a magnetic head unit having a magnetic core, a coil wound on the magnetic core, and a slider bonded to the magnetic core, the slider having a first mounting leg, the magnetic core having a second mounting leg, the first and the second mounting legs which, if thermally spread apart from each other, would cause the head unit to undergo deformation such that the head unit might fail to make data transfer with the disk; and (B) a flexure seat for resiliently supporting the head unit, the flexure seat being made from a piece of resilient sheet material and being more thermally expansible than the head unit, the flexure seat comprising:

(a) a frame portion defining a pair of openings;

(b) a pair of elongate insular portions each disposed in each of the openings in the frame portion, respectively and extending in parallel spaced relationship to each other, the head unit being mounted to the flexure seat by having each distal end of the first and second mounting legs thereof bonded to each of the insular portions, respectively; and (c) a pair of aligned bridge portions extending from and joining opposite ends of each insular portion to the frame portion, the insular portions being completely separate from each other and the frame portion except for the pair of bridge portions, whereby, being independently bonded to the pair of insular portions of the flexure seat, the first and the second mounting legs of the head unit are not thermally spread apart from each other due to difference between the coefficients of thermal expansion of the head unit and the flexure seat.

10. The magnetic head assembly of claim 9 wherein each pair of bridge portions are in centerline alignment with each of the insular portions, respectively.

11. A magnetic head assembly for data transfer with a flexible magnetic disk, comprising:

(A) a magnetic head unit having a magnetic core, a coil wound on the magnetic core, and a pair of sliders bonded to opposite sides of the core, the pair of sliders having a pair of spaced apart mounting legs which, if thermally spread apart from each other, would cause the head unit to undergo deformation such that the head unit might fail to make data transfer with the disk; and (B) a flexure seat for resiliently supporting the head unit, the flexure seat being made from a piece of resilient sheet material and being more thermally expansible than the head unit, the flexure seat comprising:

(a) a frame portion defining an opening;

(b) a pair of elongate insular portions extending in parallel spaced relationship to each other in the opening in the frame portion, the head unit being mounted to the flexure seat by having each of the pair of mounting legs thereof bonded to each of the insular portions, respectively; and (c) a first bridge portion extending from and joining one of the insular portions to the frame portion;

(d) a second bridge portion extending from and joining the other of the insular portions to the frame portion; and (e) a third bridge portion extending from and joining the pair of insular portions to each other, the insular portions being completely separate from each other and the frame portion except for the first, second, and third bridge portions, whereby, being independently bonded to the pair of insular portions of the flexure seat, the pair of mounting legs of the head unit are not thermally spread apart from each other due to difference between the coefficients of thermal expansion of the head unit and the flexure seat.

12. The magnetic head assembly of claim 11, wherein the first, the second, and the third bridge portions are aligned transversely to the pair of insular portions.

13. A magnetic head assembly for data transfer with a flexible magnetic disk, comprising:

(A) a magnetic head unit having a magnetic core, a coil wound on the magnetic core, and a slider bonded to the magnetic core, the slider having a first mounting leg, the magnetic core having a second mounting leg, the first and the second mounting legs which, if thermally spread apart from each other, would cause the head unit to undergo deformation such that the head unit might fail to make data transfer with the disk; and (B) a flexure seat for resiliently supporting the head unit, the flexure seat being made from a piece of resilient sheet material and being more thermally expansible than the head unit, the flexure seat comprising:

(a) a frame portion defining an opening;

(b) a pair of elongate insular portions extending in parallel spaced relationship to each other in the opening in the frame portion, the head unit being mounted to the flexure seat by having the first and second mounting legs thereof bonded to each of the insular portions, respectively; and (c) a first bridge portion extending from and joining one of the insular portions to the frame portion;

(d) a second bridge portion extending from and joining the other of the insular portions to the frame portion; and (e) a third bridge portion extending from and joining the pair of insular portions to each other, the insular portions being completely separate from each other and the frame portion except for the first, second, and third bridge portions, whereby, being independently bonded to the pair of insular portions of the flexure seat, the first and second mounting legs of the head unit are not thermally spread apart from each other due to difference between the coefficients of thermal expansion of the head unit and the flexure seat.

14. The magnetic head assembly of claim 13, wherein the first, the second, and the third bridge portions are aligned transversely to the pair of insular portions.

* * * * *